US007565424B2

(12) United States Patent
Ahrens, Jr. et al.

(10) Patent No.: US 7,565,424 B2
(45) Date of Patent: Jul. 21, 2009

(54) DATA PROCESSING SYSTEM, METHOD, AND PRODUCT FOR REPORTING LOSS OF SERVICE APPLICATION

(75) Inventors: George Henry Ahrens, Jr., Pflugerville, TX (US); Chetan Mehta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1739 days.

(21) Appl. No.: 09/978,352

(22) Filed: Oct. 16, 2001

(65) Prior Publication Data

US 2003/0074444 A1    Apr. 17, 2003

(51) Int. Cl.
G06F 15/173    (2006.01)
G06F 15/16    (2006.01)

(52) U.S. Cl. ........................... 709/224; 709/217
(58) Field of Classification Search ................. 709/213, 709/224, 217; 714/2
See application file for complete search history.

(56) References Cited

U.S. PATENT DOCUMENTS 4,305,397 A * 12/1981 Weisbrod et al. .............. 607/30
5,402,431 A * 3/1995 Saadeh et al. ................. 714/47
6,550,017 B1 * 4/2003 Moiin et al. .................... 714/4
2002/0021671 A1 * 2/2002 Quinlan ...................... 370/242

* cited by examiner

*Primary Examiner*—John Follansbee
*Assistant Examiner*—Karen C Tang
(74) *Attorney, Agent, or Firm*—Yee & Associates, P.C.; Diana R. Gerhardt

(57) ABSTRACT

A data processing system, method, and computer program product are disclosed for reporting a loss of a service application to a particular system administrator. The data processing system includes a logically partitioned computer system and a hardware management console. The hardware management console is a stand-alone system separate from the computer system. A service application is executable by the hardware management console for managing service of and placing service calls for the logically partitioned computer system. The logically partitioned computer system includes a service partition. A service processor included in the logically partitioned computer system monitors a presence of the service application, and reports the absence of the service application to the service partition. In response to an absence of the service application, the service partition reports the absence of the service application to a system administrator of the service partition.

16 Claims, 5 Drawing Sheets

DATA PROCESSING SYSTEM, METHOD, AND PRODUCT FOR REPORTING LOSS OF SERVICE APPLICATION

BACKGROUND OF THE INVENTION

1. Technical Field

The present invention relates generally to the field of data processing systems, and more specifically to a data processing system for reporting the loss of a service application executing on a hardware management console to a particular system administrator. Still more particularly, the present invention relates to a data processing system including a computer system and a separate hardware management console for the computer system reporting, to a particular system administrator, the loss of a service application that executes on the hardware management system where the service application is responsible for calling for service for the computer system.

2. Description of Related Art

Some data processing systems include a logically partitioned computer system and a hardware management console. The hardware management console is a computer system that is separate from the logically partitioned computer system. The hardware management console is used to control various functions of the logically partitioned computer system. For example, the hardware management console may be used to select a partition to be rebooted, select a particular firmware image to use to boot a partition, and other management functions.

The hardware management console may also be used to monitor and report errors that may occur in one of the partitions. A service application may be executed by the hardware management console which receives notification of errors from the various operating system partitions of the logically partitioned computer system. The service application is responsible for consolidating the errors, attempting to evaluate the errors, and making a minimum required number of service calls. Thus, in order to perform these functions, the hardware management console must be connected to the logically partitioned computer system and functioning properly.

A logical partitioning option (LPAR) within a data processing system (platform) allows multiple copies of a single operating system (OS) or multiple heterogeneous operating systems to be simultaneously run on a single data processing system hardware platform. A partition, within which an operating system image runs, is assigned a non-overlapping subset of the platform's hardware resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

A problem can occur on these types of data processing systems, however, when the service application is not responding. The service application may not be responding because the hardware management console has been disconnected from the logically partitioned computer system, a communication link between the hardware management console and the logically partitioned computer system is lost or not operating properly, or the service application is not executing properly. In these data processing systems, it is the responsibility of the service application executing on the hardware management console to call for service and report the errors. When the service application is not responding for one of the reasons given above, the service application cannot place service calls for the logically partitioned computer system.

Therefore, a need exists for a data processing system, method, and product for reporting the loss of a service application that executes on a hardware management console to a particular system administrator.

SUMMARY OF THE INVENTION

A data processing system, method, and computer program product are disclosed for reporting a loss of a service application to a particular system administrator. The data processing system includes a logically partitioned computer system and a hardware management console. The hardware management console is a stand-alone system separate from the computer system. A service application is executable by the hardware management console for managing service of and placing service calls for the logically partitioned computer system. The logically partitioned computer system includes a service partition. A service processor included in the logically partitioned computer system monitors a presence of the service application, and reports the absence of the service application to the service partition. In response to an absence of the service application, the service partition reports the absence of the service application to a system administrator of the service partition.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
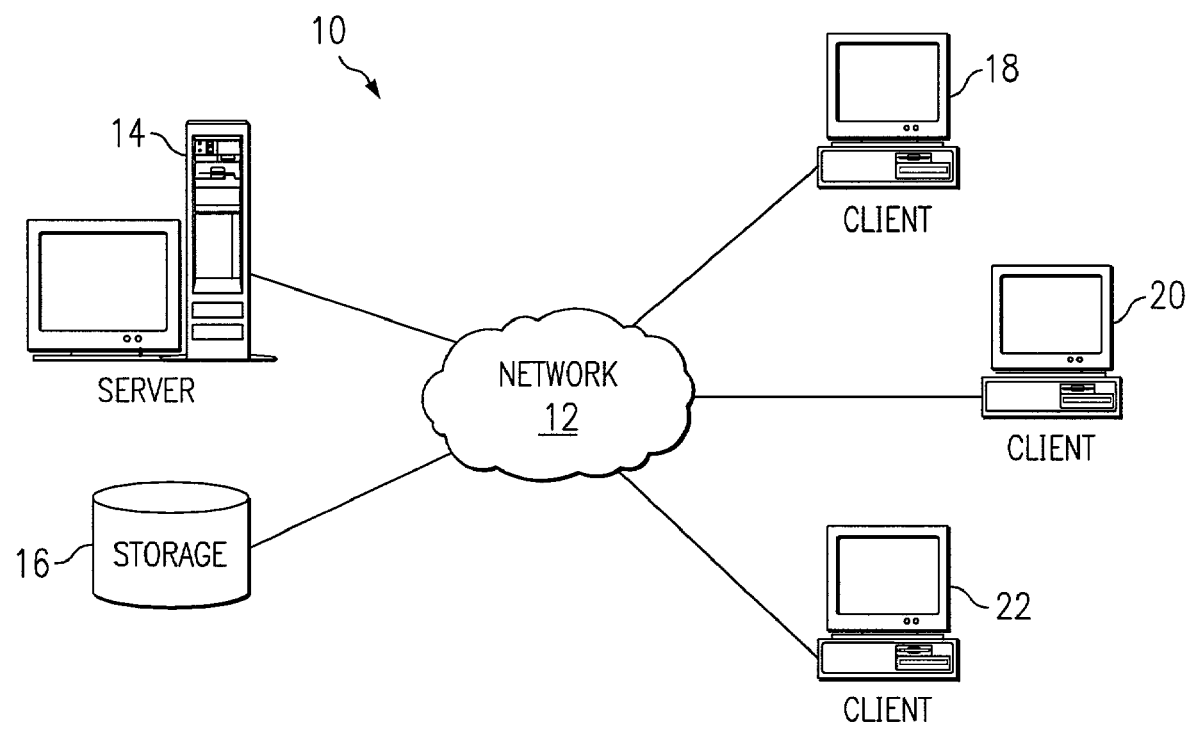
FIG. 1 is a pictorial representation which depicts a data processing system in which the present invention may be implemented in accordance with a preferred embodiment of the present invention.

A preferred embodiment of the present invention and its advantages are better understood by referring to the figures, like numerals being used for like and corresponding parts of the accompanying figures.

The present invention is a data processing system, method, and product for reporting the loss of a service application to a particular system administrator. The data processing system includes a logically partitioned computer system coupled to a hardware management console. The hardware management console is a stand-alone computer system that is separate from the logically partitioned computer system. A service application is executed by the hardware management console.

A service processor is included within the logically partitioned computer system. The logically partitioned computer system also includes a service partition. The service processor monitors a presence of the service application by monitoring a receipt of a heartbeat signal generated by the service application. The service application, executing on the hardware management console, will output a heartbeat signal to the service processor at regular intervals. If a preset period of time passes during which the service processor does not receive the heartbeat signal, the service processor will determine that the service application is absent.

Once the service processor has determined that the service application is absent, the service processor will report the absence to the service partition. The service partition will then prompt only the system administrator of the service partition to determine the cause of the absence. The service partition will prompt the service partition's system administrator to indicate whether the hardware management console is present. If the system administrator enters an indication that the hardware management console is present, the service partition will then prompt the system administrator to determine whether the physical links between the logically partitioned computer system and the hardware management console are properly connected. If the system administrator enters an indication that the physical links between the logically partitioned computer system and the hardware management console are properly connected, the service partition will then prompt the system administrator to make a manual service call.

The present invention reports the loss of the service application only to the system administrator of the service partition. The system administrator of the service partition should be geographically located physically at the hardware management console and logically partitioned computer system. The system administrators of the other logical partitions may be located geographically far from these computer systems. In this manner, because the system administrator of the service partition should always be in a physical position to respond to the prompts regarding the presence of the hardware management console as well as to whether the physical links are intact, only the system administrator of the service partition will receive these prompts. System administrators located physically far from these computer systems would not be able to respond to these prompts, and, thus do not receive them.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18-22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
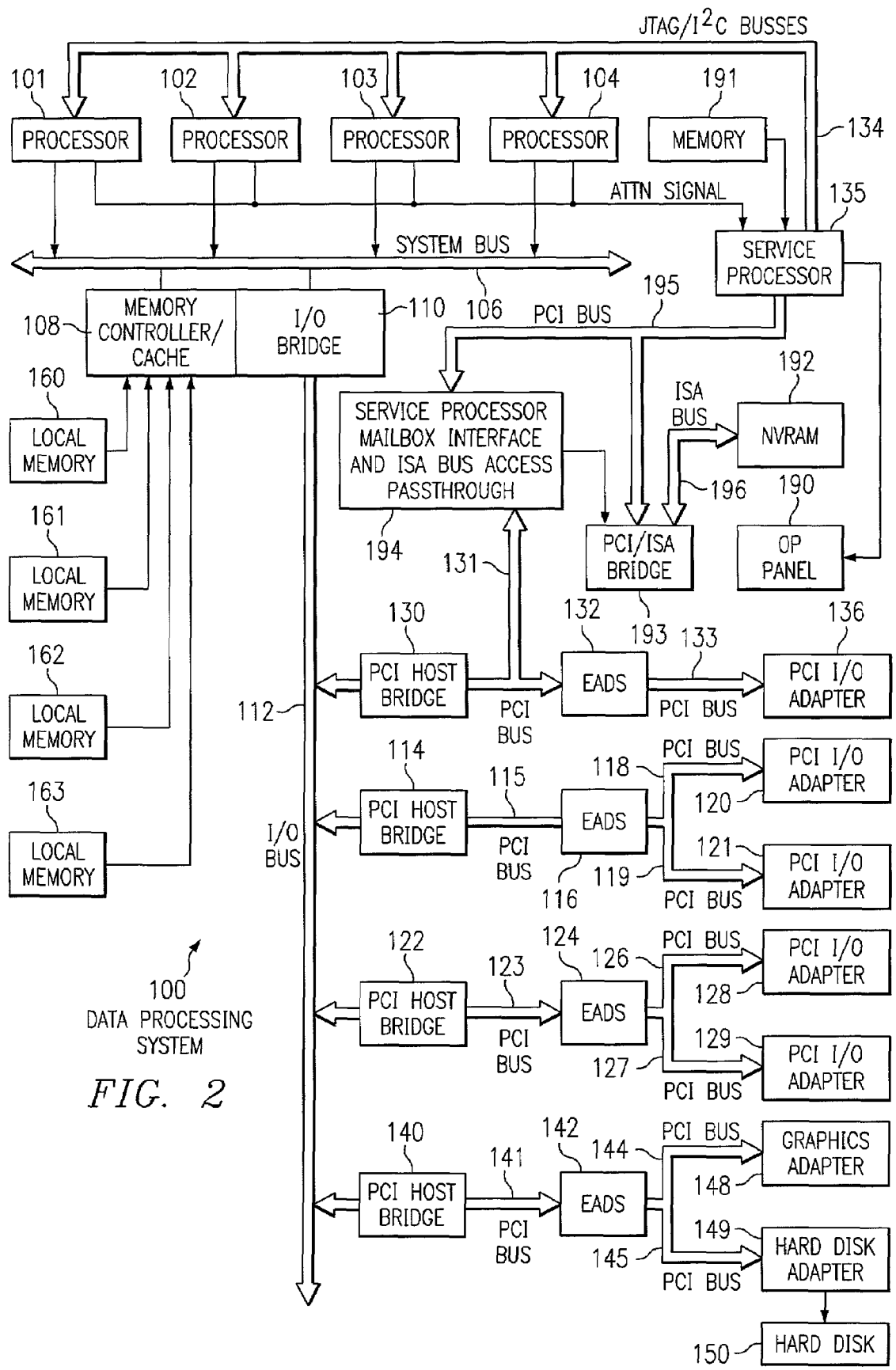
FIG. 2 is a more detailed block diagram of a data processing system in which the present invention may be implemented in accordance with the present invention.

FIG. 2 is a more detailed block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different I/O adapters 120-121, 128-129, 136, and 148-149 may be assigned to different logical partitions.

Thus, for example, suppose data processing system 100 is divided into three logical partitions, P1, P2, and P3. Each of I/O adapters 120-121, 128-129, 136, and 148-149, each of processors 101-104, and each of local memories 160-163 is assigned to one of the three partitions. For example, processor 101, memory 160, and I/O adapters 120, 128, and 129 may be assigned to logical partition P1; processors 102-103, memory 161, and I/O adapters 121 and 136 may be assigned to partition P2; and processor 104, memories 162-163, and I/O adapters 148-149 may be assigned to logical partition P3.

Each operating system executing within data processing system 100 is assigned to a different logical partition. Thus, each operating system executing within data processing system 100 may access only those I/O units that are within its logical partition.

Peripheral component interconnect (PCI) Host bridge 114 connected to I/O bus 112 provides an interface to PCI local bus 115. A number of Input/Output adapters 120-121 may be connected to PCI bus 115. Typical PCI bus implementations will support between four and eight I/O adapters (i.e. expansion slots for add-in connectors). Each I/O Adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129 by a PCI bus 126-127. Thus, additional I/O devices, such as, for example, modems or network adapters may be supported through each of PCI I/O adapters 128-129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 144 and 145 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NVRAM storage is connected to the ISA bus 196. The Service processor 135 is coupled to the service processor mailbox interface 194 through its local PCI bus 195. Service processor 135 is also connected to processors 101-104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101-104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101-104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160-163. Service processor 135 then releases the Host processors 101-104 for execution of the code loaded into Host memory 160-163. While the Host processors 101-104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101-104, memories 160-163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
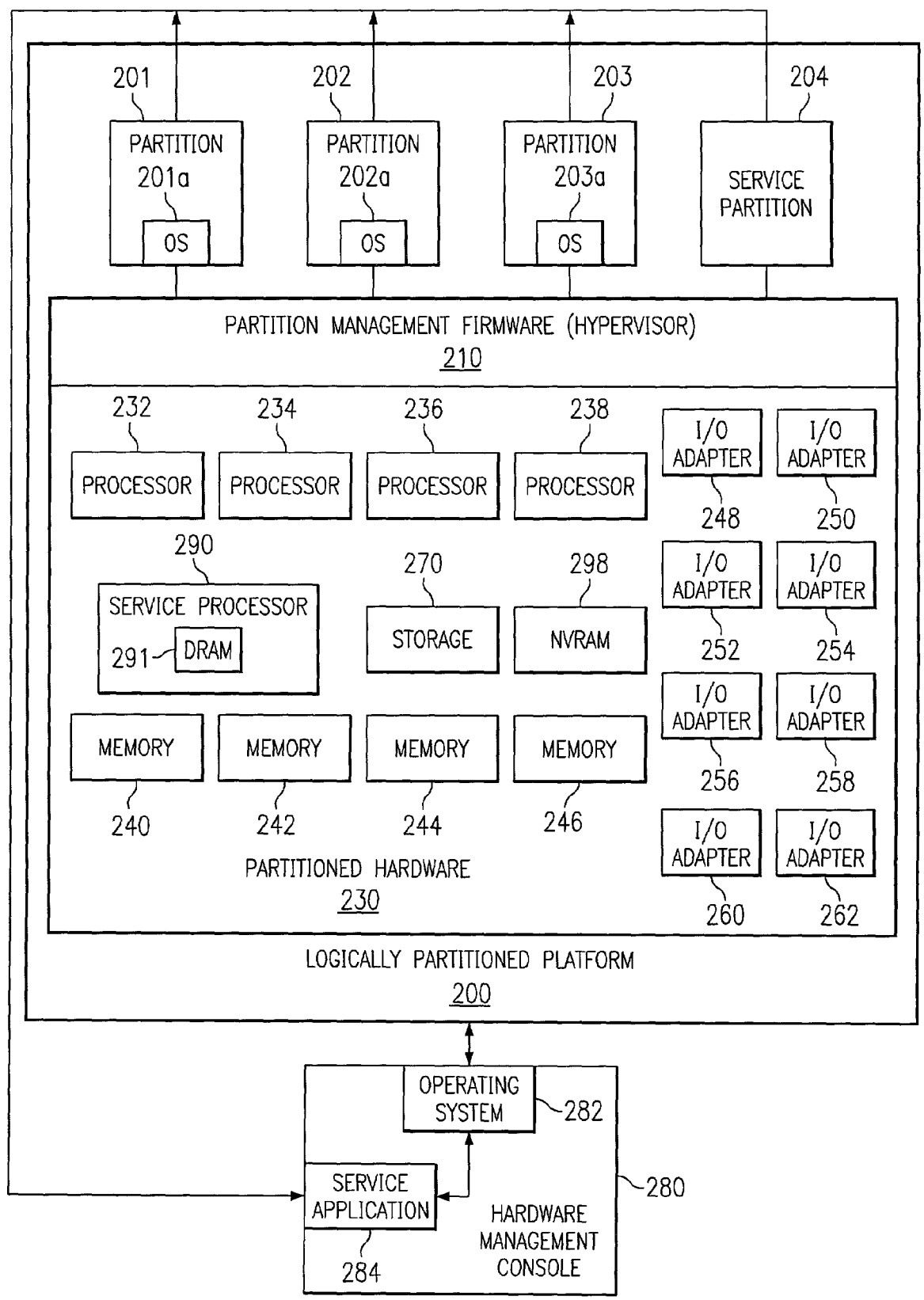
FIG. 3 is a block diagram of an exemplary logically partitioned platform in which the present invention may be implemented.

FIG. 3 is a block diagram of an exemplary logically partitioned platform in which the present invention may be implemented. Logically partitioned platform 200 includes partitioned hardware (also called the base hardware) 230, partition management firmware, also called a hypervisor 210, and partitions 201-204. Operating systems 201a-203a exist within partitions 201-203. Operating systems 201a-203a may be multiple copies of a single operating system or multiple heterogeneous operating systems simultaneously run on platform 200.

Logically partitioned platform 200 also includes a designated service partition 204. Service partition 204 may be used by a system administrator to set parameters, install firmware updates, and perform other service functions.

One or more of these partitions 201-203 may be used remotely by system administrators. Service partition 204 is not typically administered remotely.

Partitioned hardware 230 includes a plurality of processors 232-238, a plurality of system memory units 240-246, a plurality of input/output (I/O) adapters 248-262, and a storage unit 270. Each of the processors 242-248, memory units 240-246, NVRAM storage 298, and I/O adapters 248-262 may be assigned to one of multiple partitions 201-204.

Partitioned hardware 230 also includes service processor 290. A non-volatile memory device 291, such as a DRAM device, is included within service processor 291. The partition tables and firmware images described herein, as well as other information, are stored within service processor memory 291.

Partition management firmware (hypervisor) 210 performs a number of functions and services for partitions 201-203 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a-203a by virtualizing all the hardware resources of logically partitioned platform 200. Hypervisor 210 may attach I/O devices through I/O adapters 248-262 to single virtual machines in an exclusive mode for use by one of OS images 201a-203a.

A hardware management console (HMC) 280 may be coupled to data processing system 100 which includes logically partitioned platform 200. HMC 280 is a separate computer system that is coupled to service processor 290 and may be used by a user to control various functions of data processing system 100 through service processor 290. HMC 280 includes a graphical user interface (GUI) which may be used by a user to select a partition to be rebooted.

HMC 280 includes an operating system 282 and a service application 284. Service application 284 receives error messages from the various partitions 201-204. Service application 284 also generates a heartbeat signal at regular intervals and outputs this heartbeat signal, via operating system 282 to service processor 290.

Figure 4A:
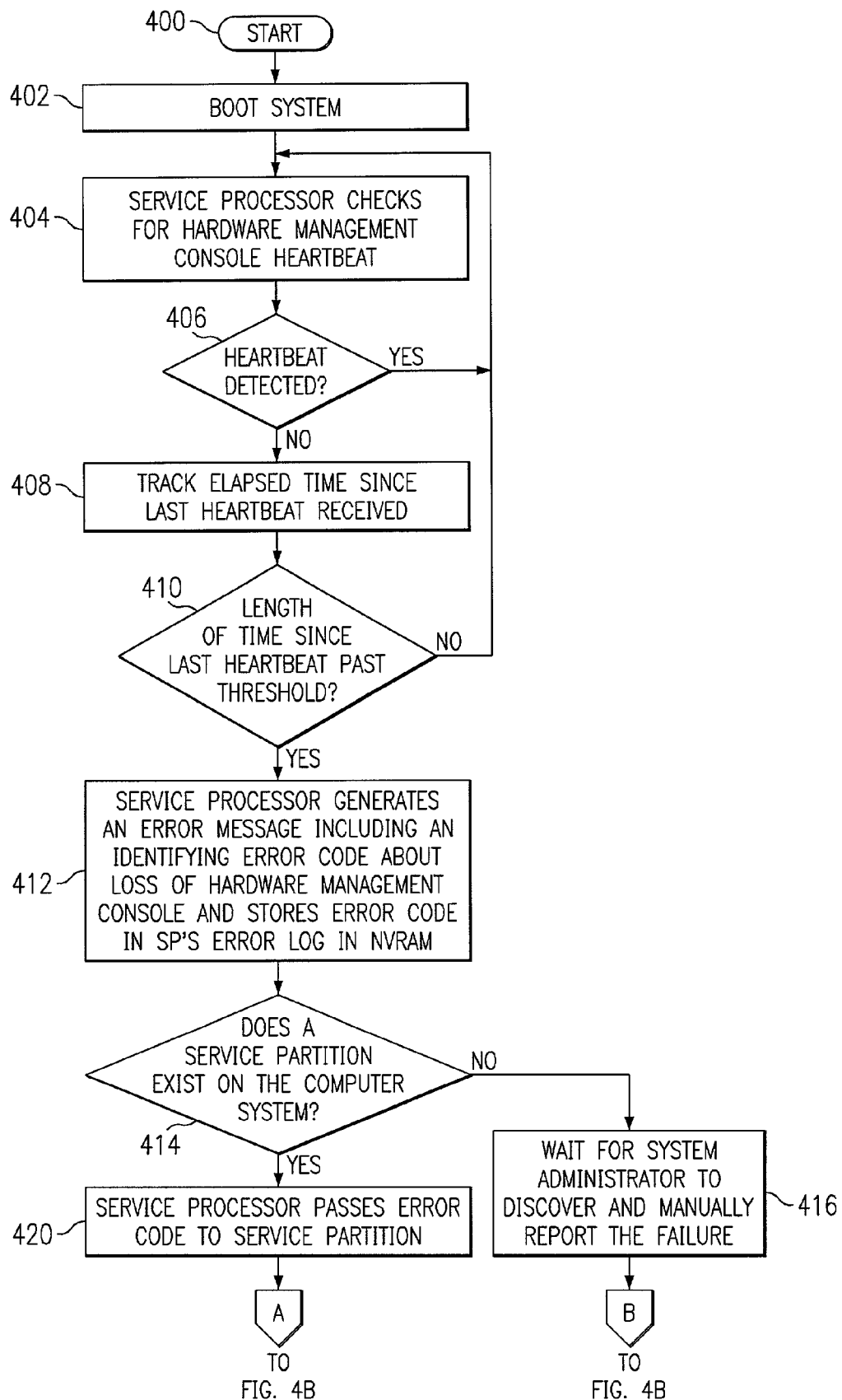
FIGS. 4A-4B illustrate a high level flow chart which depicts monitoring a presence of service application, and reporting any loss of the service application in accordance with the present invention.
Figure 4B:
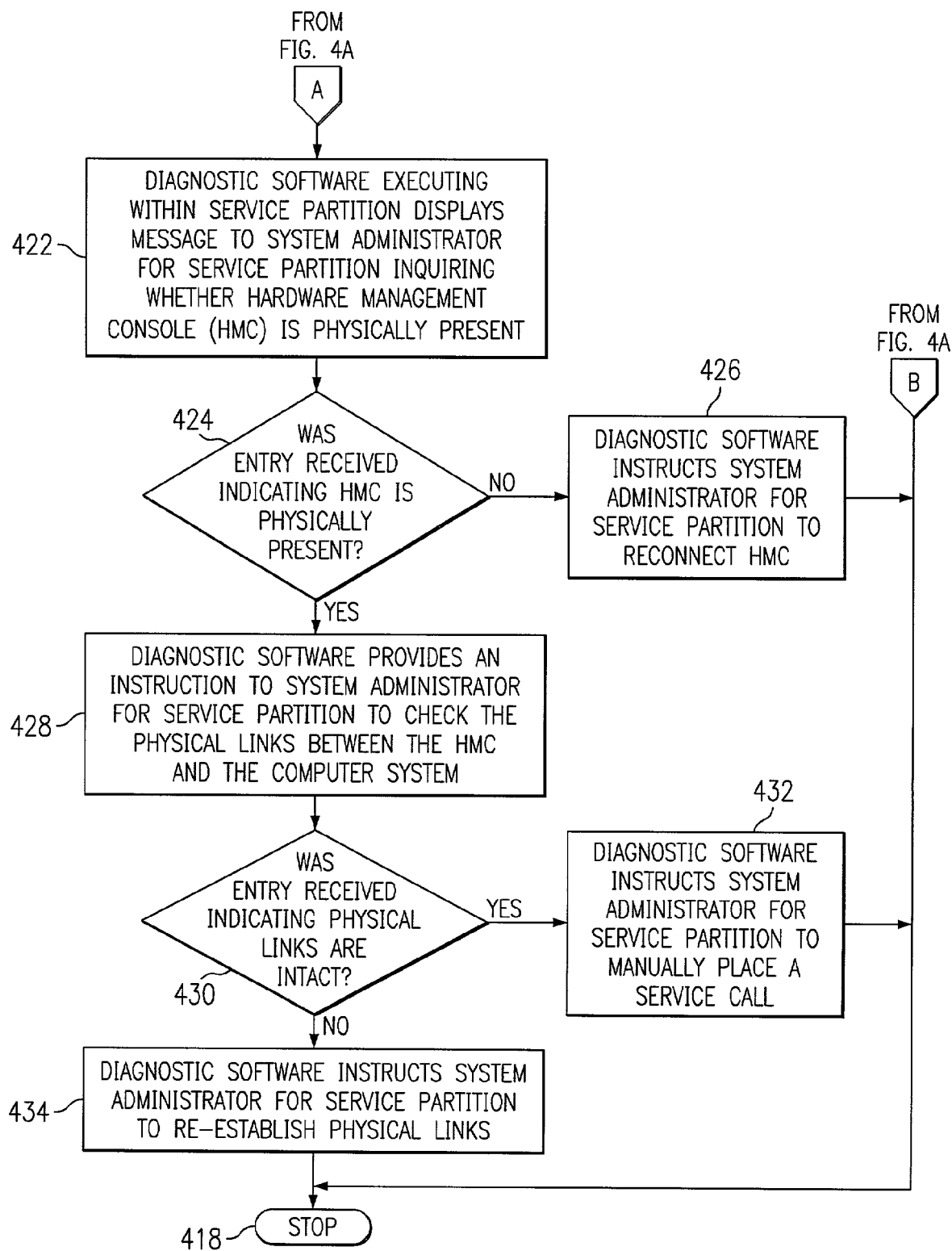

FIGS. 4A-4B illustrate a high level flow chart which depicts monitoring for a presence of a service application, and reporting any loss of the service application in accordance with the present invention. The process starts as depicted by block 400 and thereafter passes to block 402 which illustrates booting the data processing system. Next, block 404 depicts the service processor checking for a hardware management console heartbeat generated by the service application being executed by the hardware management console. Thereafter, block 406 illustrates a determination of whether or not a heartbeat was detected. If a determination is made that a heartbeat was detected, the process passes to block 408.

Block 408 depicts the service processor tracking the amount of elapsed since the last heartbeat was received. Next, block 410 illustrates a determination of whether or not the length of time since the last heartbeat was received is past a preset threshold. If a determination is made that the length of time since the last heartbeat was received is not past a preset threshold, the process passes to block 404. Referring again to block 410, if a determination is made that the length of time since the last heartbeat was received is past a preset threshold, the process passes to block 412 which depicts the service processor generating an error message that includes an error code that identifies the loss of the hardware management console, and the storage of the error code in the service processor's error log. The service processor's error log is stored in NVRAM 298.

The process then passes to block 414 which illustrates a determination of whether or not a service partition has been established on the computer system. A user may or may not choose to designate a service partition in the logically partitioned computer system. If a determination is made that no service partition has been established, the process passes to block 416 which depicts waiting for the system administrator to discover and manually report the failure. In this case any errors are logged in the service processor until either a service partition is designated, or the errors are removed during a service visit that resulted from a manual service call. The process then terminates as illustrated by block 418.

Referring again to block 414, if a determination is made that a service partition does exist on the computer system, the process passes to block 420 which illustrates the service processor passing the error code to the service partition. Next, block 422 depicts diagnostic software that is executing within the service partition displaying a message to the system administrator of the service partition inquiring about whether the hardware management console is physically present. Thereafter, block 424 illustrates a determination of whether or not an entry was received indicating that the hardware management console is physically present. If a determination is made that an entry was received indicating that the hardware management console is not physically present, the process passes to block 426 which depicts the diagnostic software instructing the system administrator of the service partition to connect the hardware management console. The process then terminates as illustrated by block 418.

Referring again to block 424, if a determination is made that an entry was received indicating that the hardware management console is physically present, the process passes to block 428 which depicts the diagnostic software providing an instruction to the system administrator of the service partition to check the physical links between the hardware management console and the logically partitioned computer system.

Next, block 430 depicts a determination of whether or not an entry was received indicating that the physical links are intact. If a determination is made that an entry was received indicating that the physical links are intact, the process passes to block 432 which depicts the diagnostic software instructing the system administrator of the service partition to manually place a service call. The process then terminates as illustrated by block 418.

Referring again to block 430, if a determination is made that an entry was received indicating that the physical links are not intact, the process passes to block 434 which depicts the diagnostic software providing an instruction to the system administrator of the service partition to reestablish the physical links. The process then terminates as illustrated by block 418.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system including a logically partitioned computer system and a hardware management console, said hardware management console being a stand-alone system separate from said logically partitioned computer system, a service application being executable by said hardware management console for managing service of and placing service calls for said logically partitioned computer system, said method comprising the steps of:

including a service partition and a service processor within said logically partitioned computer system;

monitoring, by said service processor, a presence of said service application executing on said hardware management console; and in response to an absence of said service application, reporting, utilizing said service partition, said absence of said service application to a system administrator of said service partition.

2. The method according to claim 1, further comprising the step of reporting, from said service processor, said absence of said service application to said service partition.

3. The method according to claim 1, further comprising the steps of:

outputting a signal from said service application utilizing said hardware management console to said service processor; and utilizing said signal, by said service processor, to monitor a presence of said service application.

4. The method according to claim 3, further comprising the step of determining that said service application is absent in response to an absence of said signal.

5. The method according to claim 4, further comprising the steps of:

displaying a message utilizing said service partition prompting said system administrator of said service partition to check whether said hardware management console is connected to said logically partitioned computer system;

receiving an entry in response to said message; and in response to an entry that said hardware management console is disconnected from said logically partitioned computer system, displaying a message to said system administrator to reconnect said hardware management console to said logically partitioned computer system.

6. The method according to claim 5, further comprising the steps of:

in response to an entry of a message that said hardware management console is connected to said logically partitioned computer system, displaying a message utilizing said service partition prompting said system administrator to check physical links between said hardware management console and said logically partitioned computer system;

receiving an entry in response to said message; and in response to an entry that said physical links are not intact, displaying a message utilizing said service partition prompting said system administrator to reestablish said physical links between said hardware management console and said logically partitioned computer system.

7. The method according to claim 6, further comprising the step of in response to an entry that said physical links are intact, displaying a message utilizing said service partition prompting said system administrator to manually place a service call.

8. The method according to claim 4, further comprising the steps of:

displaying a message utilizing said service partition prompting said system administrator to check physical links between said hardware management console and said logically partitioned computer system;

receiving an entry in response to said message; and in response to an entry that said physical links are not intact, displaying a message utilizing said service partition prompting said system administrator to reestablish said physical links between said hardware management console and said logically partitioned computer system.

9. A data processing system including a logically partitioned computer system and a hardware management console, said hardware management console being a stand-alone system separate from said logically partitioned computer system, a service application being executable by said hardware management console for managing service of and placing service calls for said logically partitioned computer system, comprising:

a service partition and a service processor included within said logically partitioned computer system;

said service processor for monitoring a presence of said service application executing on said hardware management console; and in response to an absence of said service application, said service partition for reporting said absence of said service application to a system administrator of said service partition.

10. The system according to claim 9, further comprising said service processor for reporting said absence of said service application to said service partition.

11. The system according to claim 9, further comprising:

said service application for outputting a signal utilizing said hardware management console to said service processor; and said service processor for utilizing said signal to monitor a presence of said service application.

12. The system according to claim 11, further comprising said service processor for determining that said service application is absent in response to an absence of said signal.

13. The system according to claim 12, further comprising:

said service partition for displaying a message prompting said system administrator of said service partition to check whether said hardware management console is connected to said logically partitioned computer system;

an entry being received in response to said message; and in response to an entry that said hardware management console is disconnected from said logically partitioned computer system, said logically partitioned computer system for displaying a message to said system administrator to reconnect said hardware management console to said logically partitioned computer system.

14. The system according to claim 13, further comprising:

in response to an entry of a message that said hardware management console is connected to said logically partitioned computer system, said service partition for displaying a message prompting said system administrator to check physical links between said hardware management console and said logically partitioned computer system;

an entry being received in response to said message; and in response to an entry that said physical links are not intact, said service processor for displaying a message prompting said system administrator to reestablish said physical links between said hardware management console and said logically partitioned computer system.

15. The system according to claim 14, further comprising in response to an entry that said physical links are intact, said service partition for displaying a message prompting said system administrator to manually place a service call.

16. The system according to claim 12, further comprising:

said service partition for displaying a message prompting said system administrator to check physical links between said hardware management console and said logically partitioned computer system;

an entry being received in response to said message; and in response to an entry that said physical links are not intact, said service partition for displaying a message prompting said system administrator to reestablish said physical links between said hardware management console and said logically partitioned computer system.

* * * * *